(No Model.)
C. L. COFFIN.
METHOD OF ELECTRIC WELDING.
No. 419,033. Patented Jan. 7, 1890.
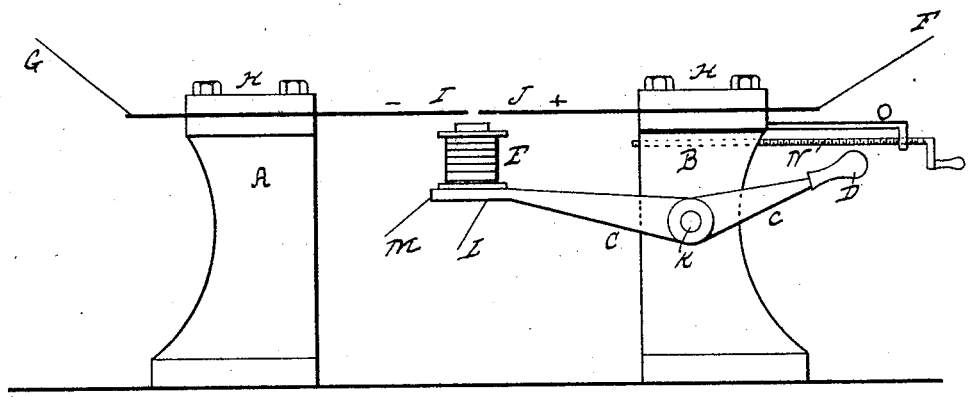
Witnesses
Geo. H. Lothrop
Gertrude A. Anderson.
Inventor
Charles L. Coffin

UNITED STATES PATENT OFFICE.

CHARLES L. COFFIN, OF DETROIT, MICHIGAN.

METHOD OF ELECTRIC WELDING.

SPECIFICATION forming part of Letters Patent No. 419,033, dated January 7, 1890.

Application filed September 11, 1889. Serial No. 323,625. (No model.)

*To all whom it may concern:*

Be it known that I, CHARLES L. COFFIN, of Detroit, in the county of Wayne and State of Michigan, have invented a new and useful Improvement in the Process of Electric Welding, of which the following is a specification.

My invention consists in an improved process of electric welding, hereinafter fully described and claimed.

The drawing is a side elevation of a machine which may be used to practice my invention.

A and B represent posts, which may stand on an insulated foundation.

H H represent screw-clamps on posts A and B, which are to be insulated from said posts, as indicated in heavy black lines, when said posts are not themselves insulated.

I and J represent two pieces of metal to be welded together, securely held in clamps H H, one of them, as J, being connected with the positive pole of a generator of electricity by the conductor F and the other I being connected with the negative pole of said generator by the conductor G.

The welding operation is performed by pressing the edges of I and J together, a screw-rod N and follower O being indicated to suggest how this may be done, and passing a current of electricity through the pieces I J, by which their edges become sufficiently heated to weld together under pressure.

I have discovered that by subjecting the joint between I and J to the influence of a magnet acting across the path of the current while the current is passing the electical resistance of the joint is secured and the heating effect of the current becomes greater.

E represents an electro-magnet whose coil is connected by conductors M and L with a source of electro energy. Of course the electro-magnet E may be a permanent magnet. As it is frequently desirable to regulate the intensity of the magnetic influence upon the joint, I have indicated an easy way of doing this, magnet E being shown as mounted on one end of the lever C, fulcrumed to post B at K, and the other end of said lever C being provided with a handle D, by which means the magnet E may be moved toward or away from the joint. I find that after the two pieces have been joined together a better weld may be obtained by ceasing to press the joint together and applying strain tending to separate the joint, (taking care not to exceed the strength of the weld,) the current being still passing. This increases the electrical resistance of the joint, and consequently increases the heat. This force is only applied for a short time, and the joint is finished by rolling or hammering.

I am aware that the use of a magnet in welding with the voltaic arc for the purpose of increasing the power and length of the arc is shown in a patent to De Bernardos, and do not herein claim that invention.

What I claim as my invention, and desire to secure by Letters Patent, is—

1. The herein-described method of electrically welding together two pieces of metal, consisting in pressing together the two pieces to be welded, traversing the joint between the two pieces by an electrical current, and submitting the joint to the influence of a magnet acting across the line of the current.

2. The herein-described method of electrically welding metals, consisting in pressing together the articles to be welded, traversing the joint by an electrical current, submitting the joint to the influence of a magnet acting across the line of the current, stopping the pressure and subjecting the joint to a force tending to separate it, and finally completing the weld by hammering or rolling.

CHARLES L. COFFIN.

Witnesses:
GEO. H. LOTHROP,
GERTRUDE ANDERSON.